(12) United States Patent
Miller et al.

(10) Patent No.: US 7,224,269 B2
(45) Date of Patent: May 29, 2007

(54) METHOD AND SYSTEM FOR RESETTING TIRE PRESSURE MONITORING SYSTEM FOR AN AUTOMOTIVE VEHICLE

(75) Inventors: Thomas Miller, Ann Arbor, MI (US); Thomas McQuade, Ann Arbor, MI (US); Robert Mince, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 10/905,093

(22) Filed: Dec. 15, 2004

(65) Prior Publication Data

US 2006/0139158 A1 Jun. 29, 2006

(51) Int. Cl.
*B60C 23/00* (2006.01)

(52) U.S. Cl. .................... 340/444; 340/5.61; 340/5.64; 340/825.72

(58) Field of Classification Search .............................. 340/426.13–426.17, 445–448, 5.61, 5.64, 340/825.72, 825.69
See application file for complete search history.

(56) References Cited

U.S. PATENT DOCUMENTS

| | | | |
|---|---|---|---|
| 1,948,427 A | 2/1934 | Moecker | |
| 1,954,153 A | 4/1934 | Taylor | |
| 2,274,557 A | 2/1942 | Morgan et al. | |
| 2,578,358 A | 12/1951 | Jellison | |
| 2,589,623 A | 3/1952 | Merritt et al. | |
| 3,852,717 A | 12/1974 | Hosaka et al. | |
| 3,911,855 A | 10/1975 | Haven | |
| 3,965,847 A | 6/1976 | Deming | |
| 3,974,477 A | 8/1976 | Hester | |
| 4,051,803 A | 10/1977 | Arnone | |
| 4,316,176 A | 2/1982 | Gee et al. | |
| 4,376,931 A | 3/1983 | Komatu et al. | |
| 4,443,785 A | 4/1984 | Speranza | |
| 4,494,106 A | 1/1985 | Smith et al. | |
| 4,510,484 A | 4/1985 | Snyder | |

(Continued)

OTHER PUBLICATIONS

U.S. Appl. No. 10/064,691, filed Aug. 7, 2002, Talukder, Allowed-Fee Paid.

(Continued)

*Primary Examiner*—Jeffery Hofsass
*Assistant Examiner*—Hoi C. Lau
(74) *Attorney, Agent, or Firm*—Gary Smith; Artz & Artz, PC

(57) ABSTRACT

A tire pressure monitoring system (12) for a vehicle (10) includes a vehicle speed sensor (38, 98) that is used to generate a vehicle speed signal. A receiver (28) operates using a first protocol when the vehicle speed signal is below a first speed threshold and operates using a second protocol when the vehicle speed is above the speed threshold. A remote keyless entry system (23) is coupled to the receiver and operates when the vehicle speed is below a speed threshold. The remote keyless entry system (23) receives signals from a keyless entry transmitter (60) using the first protocol. A tire pressure monitoring system (12) has a pressure transmitter (16A-16E) that generates a signal using a first protocol and a second protocol when the speed signal is below the speed threshold and generating the signal using only the second protocol when the speed signal is above the speed threshold.

19 Claims, 2 Drawing Sheets

U.S. PATENT DOCUMENTS

| | | |
|---|---|---|
| 4,574,267 A | 3/1986 | Jones |
| 4,742,476 A | 5/1988 | Schwartz et al. |
| 5,061,917 A | 10/1991 | Higgs et al. |
| 5,109,213 A | 4/1992 | Williams |
| 5,463,374 A | 10/1995 | Mendez et al. |
| 5,517,853 A | 5/1996 | Chamussy |
| 5,569,848 A | 10/1996 | Sharp |
| 5,583,482 A | 12/1996 | Chamussy et al. |
| 5,587,698 A | 12/1996 | Genna |
| 5,589,815 A | 12/1996 | Nishihara et al. |
| 5,600,301 A | 2/1997 | Robinson, III |
| 5,602,524 A | 2/1997 | Mock et al. |
| 5,612,671 A | 3/1997 | Mendez et al. |
| 5,656,993 A | 8/1997 | Coulthard |
| 5,661,651 A | 8/1997 | Geschke et al. |
| 5,717,376 A | 2/1998 | Wilson |
| 5,721,528 A | 2/1998 | Boesch et al. |
| 5,741,966 A | 4/1998 | Handfield et al. |
| 5,790,016 A | 8/1998 | Konchin et al. |
| 5,801,306 A | 9/1998 | Chamussy et al. |
| 5,808,190 A | 9/1998 | Ernst |
| 5,838,229 A | 11/1998 | Robinson, III |
| 5,853,020 A | 12/1998 | Widner |
| 5,880,363 A | 3/1999 | Meyer |
| 5,913,240 A | 6/1999 | Drähne et al. |
| 5,926,087 A | 7/1999 | Busch et al. |
| 5,939,977 A | 8/1999 | Monson |
| 5,959,202 A | 9/1999 | Nakajima |
| 5,963,128 A | 10/1999 | McClelland |
| 5,965,808 A | 10/1999 | Normann et al. |
| 5,969,239 A | 10/1999 | Tromeur et al. |
| 5,990,785 A | 11/1999 | Suda |
| 5,999,091 A | 12/1999 | Wortham |
| 6,002,327 A | 12/1999 | Boesch et al. |
| 6,034,597 A | 3/2000 | Normann et al. |
| 6,043,738 A | 3/2000 | Stewart et al. |
| 6,046,672 A | 4/2000 | Pearman |
| 6,078,252 A | 6/2000 | Kulczycki et al. |
| 6,111,520 A | 8/2000 | Allen et al. |
| 6,161,071 A | 12/2000 | Shuman et al. |
| 6,199,575 B1 | 3/2001 | Widner |
| 6,204,758 B1 | 3/2001 | Wacker et al. |
| 6,218,936 B1 | 4/2001 | Imao |
| 6,225,895 B1 | 5/2001 | Bigelow, Jr. |
| 6,232,875 B1 | 5/2001 | DeZorzi |
| 6,246,317 B1 | 6/2001 | Pickornik et al. |
| 6,259,361 B1 | 7/2001 | Robillard et al. |
| 6,271,748 B1 | 8/2001 | Derbyshire et al. |
| 6,275,148 B1 | 8/2001 | Takamura |
| 6,275,231 B1 | 8/2001 | Obradovich |
| 6,278,363 B1 | 8/2001 | Bezek et al. |
| 6,278,379 B1 | 8/2001 | Allen et al. |
| 6,292,096 B1 | 9/2001 | Munch et al. |
| 6,293,147 B1 | 9/2001 | Parker et al. |
| 6,327,570 B1 | 12/2001 | Stevens |
| 6,339,736 B1 | 1/2002 | Moskowitz et al. |
| 6,369,703 B1 | 4/2002 | Lill |
| 6,385,511 B1 | 5/2002 | Fondeur et al. |
| 6,446,502 B1 | 9/2002 | Normann et al. |
| 6,448,891 B2 | 9/2002 | Barnett |
| 6,448,892 B1 | 9/2002 | Delaporte |
| 6,453,737 B2 | 9/2002 | Young et al. |
| 6,463,798 B2 | 10/2002 | Niekerk et al. |
| 6,498,967 B1 | 12/2002 | Hopkins et al. |
| 6,518,876 B1 | 2/2003 | Marguet et al. |
| 6,591,671 B2 | 7/2003 | Brown |
| 6,612,165 B2 | 9/2003 | Juzswik et al. |
| 6,631,637 B2 | 10/2003 | Losev |
| 6,667,687 B1 | 12/2003 | DeZorzi |
| 6,672,150 B2 | 1/2004 | Delaporte |
| 6,694,807 B2 | 2/2004 | Chuang |
| 6,745,624 B2 | 6/2004 | Porter |
| 6,750,762 B1 | 6/2004 | Porter |
| 6,771,169 B1 | 8/2004 | Kaminski |
| 6,782,741 B2 | 8/2004 | Imbert |
| 6,784,794 B1 | 8/2004 | McQuade |
| 6,805,000 B1 | 10/2004 | Sheikh-Bahaie |
| 6,850,155 B1 | 2/2005 | McQuade |
| 6,885,282 B2 * | 4/2005 | Desai et al. ............... 340/5.61 |
| 6,900,725 B1 | 5/2005 | Berry |
| 6,914,523 B2 * | 7/2005 | Munch et al. ............. 340/447 |
| 6,952,160 B1 | 10/2005 | Bennie |
| 6,982,636 B1 | 1/2006 | Bennie |
| 6,985,076 B1 | 1/2006 | Bennie |
| 2002/0008718 A1 | 1/2002 | Obradovich |
| 2002/0149477 A1 * | 10/2002 | Desai et al. ................ 340/442 |
| 2003/0122660 A1 * | 7/2003 | Kachouh et al. ........... 340/442 |
| 2005/0011257 A1 | 1/2005 | Modawell |
| 2005/0200464 A1 | 9/2005 | Bennie |

OTHER PUBLICATIONS

U.S. Appl. No. 10/908,364, filed May 9, 2005, Phalak.
U.S. Appl. No. 10/908,430, filed May 11, 2005, McQuade.
U.S. Appl. No. 11/161,835, filed Aug. 18, 2005, Miller.
U.S. Appl. No. 11/163,586, filed Oct. 24, 2005, Miller.
U.S. Appl. No. 11/164,624, filed Nov. 30, 2005, Pearce.

* cited by examiner

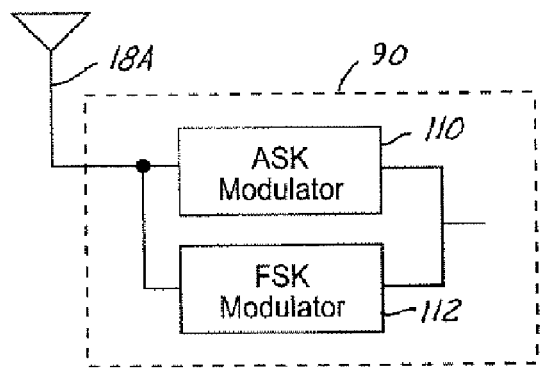
FIG.3
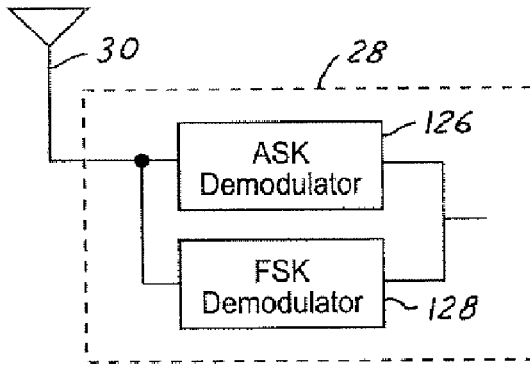
FIG.6
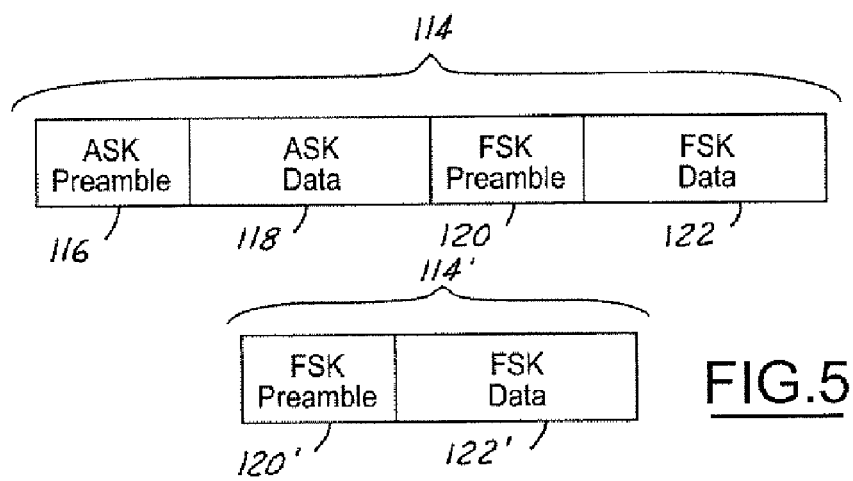
FIG.4
FIG.5
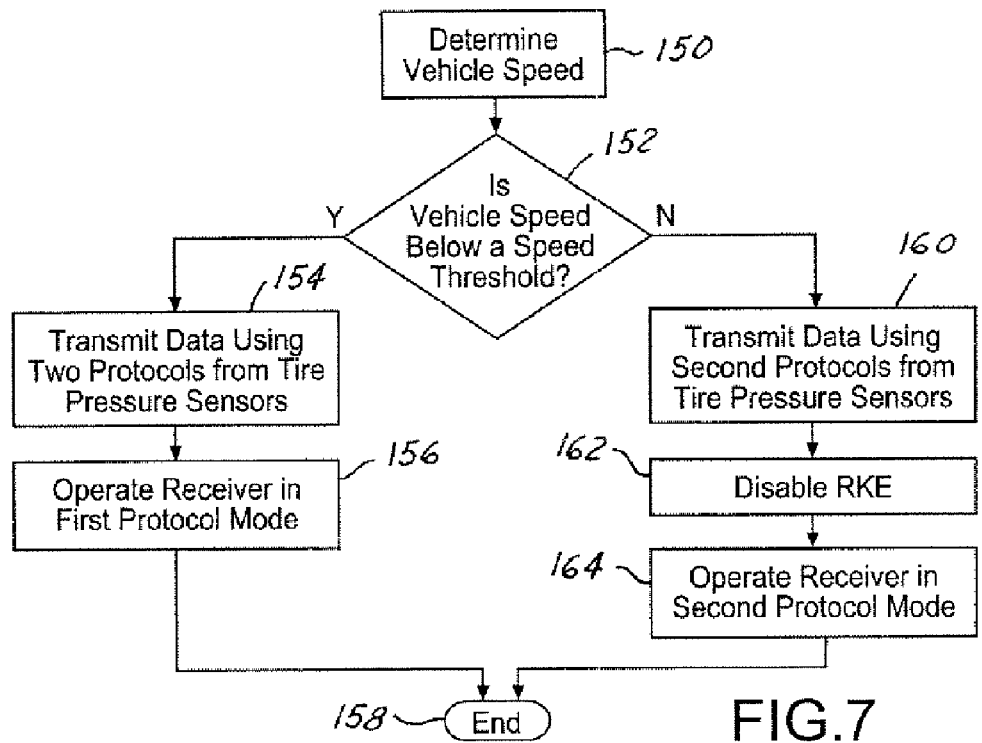
FIG.7

METHOD AND SYSTEM FOR RESETTING TIRE PRESSURE MONITORING SYSTEM FOR AN AUTOMOTIVE VEHICLE

TECHNICAL FIELD

The present invention relates generally to a system for monitoring tire pressure in an automotive vehicle, and more particularly, to a method and system for transmitting signals from sensors to a receiver to allow integration with other vehicle electrical systems such as remote keyless entry systems.

BACKGROUND OF THE INVENTION

Various types of pressure sensing systems for monitoring the pressure within the tires of an automotive vehicle have been proposed. Such systems generate a pressure signal using an electromagnetic (EM) signal, which is transmitted to a receiver. The pressure signal corresponds to the pressure within the tire. When the tire pressure drops below a predetermined pressure, an indicator is used to signal the vehicle operator of the low pressure.

Various tire manufacturers have suggested various locations for the pressure sensors. Known systems include coupling a pressure sensor to the valve stem of the tire. Other known systems and proposed systems locate the pressure sensors in various locations within the tire wall or tread. Tires are mounted to wheels that are commonly made from steel or aluminum.

When the tire pressure is a low tire pressure a signal is received by a controller. The controller warns the vehicle operator to remedy the problem. Such problems are remedied by replacing the low tire with a spare tire or filling the low tire to increase the pressure therein.

A tire pressure monitoring system uses a receiver to receive the information from the various tire pressure transmitters. Other vehicle systems also use a receiver for receiving information. For example, a remote keyless entry system generates various control signals from a transmitter including locking and unlocking control signals. In vehicle systems it is desirable to reduce the number of components and therefore the costs associated with each of the components. It would therefore be desirable to combine the tire pressure monitoring receiver with a receiver in another vehicle system such as a remote keyless entry receiver.

SUMMARY OF THE INVENTION

The present invention allows the tire pressure monitoring system and another vehicle system such as a remote keyless entry system to share a receiver.

In one aspect of the invention, a method comprises determining a vehicle speed and when the vehicle speed is below a speed threshold, generating a first preamble signal and a first data signal using a first protocol from a tire pressure sensor. When the vehicle is below the speed threshold, a receiver operates using the first protocol. When the vehicle is above the speed threshold, operating the receiver using the second protocol.

In a further aspect of the invention, a vehicle system includes a vehicle speed sensor generating a vehicle speed signal and a receiver that operates using a first protocol when the vehicle speed signal is below a speed threshold and operating using a second protocol when the vehicle speed is above the speed threshold. The system further includes a remote keyless entry system coupled to the receiver operating when the vehicle speed signal is below a speed threshold. The remote keyless entry system receives signals from the keyless entry transmitter using the first protocol. The system further includes a tire pressure monitoring system coupled to the receiver. The tire pressure monitoring system has a first pressure transmitter generating a signal using a first protocol and a second protocol when the speed signal is below the speed threshold and generating the signal using only the second protocol when the speed is above the speed threshold.

One advantage of the invention is that by sharing a receiver with another vehicle system the overall cost of the vehicle may be reduced. Another advantage is that the tire pressure sensors may be incorporated into a single receiver system as described herein or a system having a unique TPMS receiver.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 3 is a diagrammatic view of a transmitter/receiver circuit of FIG. 2.

FIG. 4 is a diagrammatic view of a digital word from a pressure transmitter.

FIG. 5 is a diagrammatic view of a digital word from a pressure transmitter when the vehicle speed is above a predetermined speed.

FIG. 6 is a block diagrammatic view of a receiver.

FIG. 7 is a flow chart illustrating the operation of the present invention.

DETAILED DESCRIPTION OF THE PREFERRED EMBODIMENT

Figure 1:
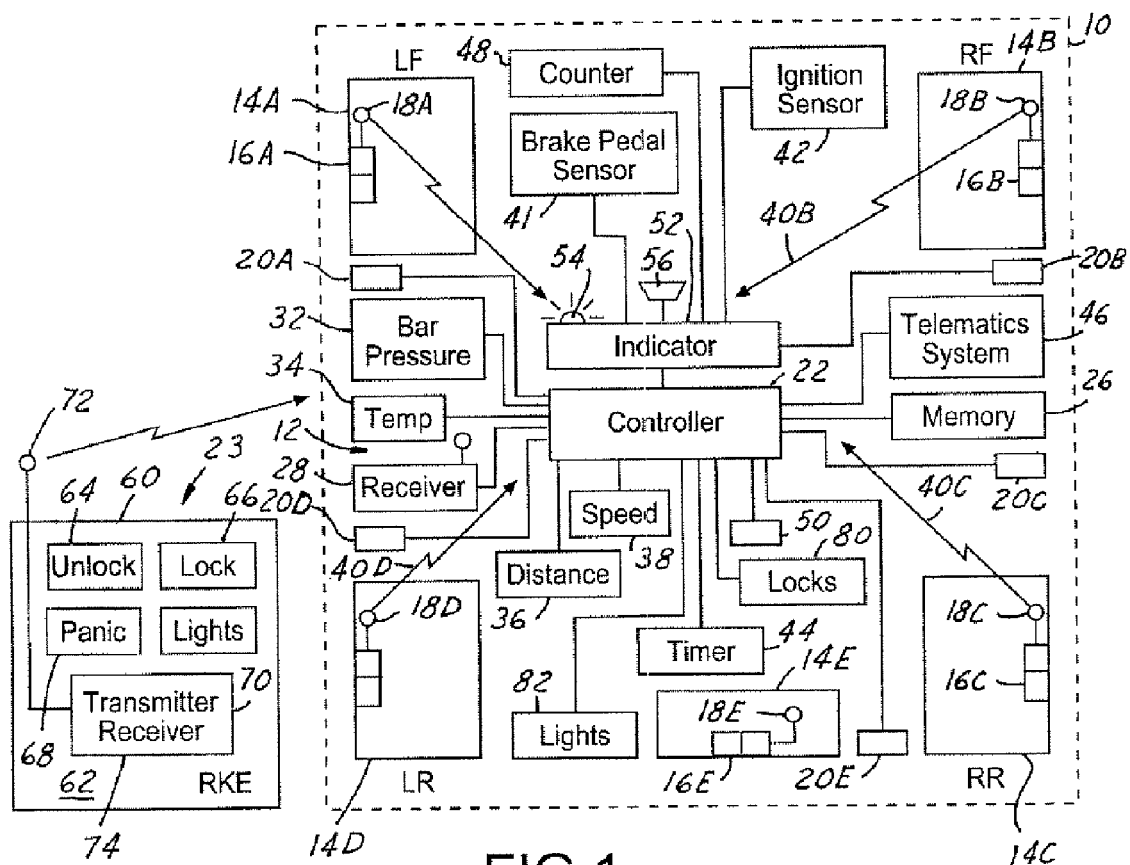
FIG. 1 is a block diagrammatic view of a pressure monitoring system according to the present invention.

In the following figures, the same reference numerals will be used to illustrate the same components. Those skilled in the art will recognize that the various components set forth herein could be changed without varying from the scope of the invention.

Referring now to FIG. 1, an automotive vehicle 10 has a pressure monitoring system 12 for monitoring the air pressure within a left front tire 14A, a right front tire 14B, a right rear tire 14C, and a left rear tire 14D. Each tire 14A-14D has a respective tire pressure sensor circuit 16A, 16B, 16C, and 16D, each of which has a respective antenna 18A, 18B, 18C, and 18D. Each tire is positioned upon a corresponding wheel.

A fifth tire or spare tire 14E is also illustrated having a tire pressure sensor circuit 16E and a respective antenna 18E. Although five wheels are illustrated, the pressure of various numbers of wheels may be increased. For example, the present invention applies equally to vehicles such as pickup trucks that have dual wheels for each rear wheel. Also, various numbers of wheels may be used in a heavy duty truck application having dual wheels at a number of locations. Further, the present invention is also applicable to trailers and extra spares as will be further described below.

Each tire 14 may have a respective initiator 20A-20E positioned within the wheel wells adjacent to the tire 14.

Initiator 20 generates a low frequency RF signal initiator and is used to initiate a response from each wheel so that the position of each wheel may be recognized automatically by the pressure monitoring system 12. Initiators 20A-20E are preferably coupled directly to a controller 22. In commercial embodiments where the position programming is done manually, the initiators may be eliminated.

Controller 22 is preferably a microprocessor-based controller having a programmable CPU that may be programmed to perform various functions and processes including those set forth herein. Although one controller 22 is illustrated, various numbers of controllers may be represented thereby. Controller 22 acts to control a tire pressure monitoring system, as well as another vehicle system such as a remote keyless entry system 23. The remote keyless entry system 23 will be described below.

Controller 22 has a memory 26 associated therewith. Memory 26 may be various types of memory including ROM or RAM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table.

Controller 22 is also coupled to a receiver 28. Although receiver 28 is illustrated as a separate component, receiver 28 may also be included within controller 22. Receiver 28 has an antenna 30 associated therewith. Antenna 30 is used to receive pressure and various information from tire pressure circuits 16A-16E and control signals such as locking/unlocking signals from a remote keyless entry system 23. Controller 22 is also coupled to a plurality of sensors. Such sensors may include a barometric pressure sensor 32, an ambient temperature sensor 34, a distance sensor 36, a speed sensor 38, a brake pedal sensor 41, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used, but is not required, in calculation for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a wheel speed sensor used in anti-lock braking systems, or a transmission sensor. Speed sensing may also be determined at each pressure transmitter and at the vehicle. The speed sensor may be a discrete sensor or a sensor combined with signal processing such as when anti-lock brake speed sensor outputs are averaged to obtain a vehicle speed.

Timer 44 may also be used to measure various times associated with the process set forth herein. The timer 44, for example, may measure the time the spare tire is stowed, or measure a time after an initiator signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

A telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator may be an LED or LCD panel used to provide commands to the vehicle operator when manual calibrations are performed.

The remote keyless entry system 23 includes a transmitter 60 that has a housing 62. The transmitter 60 may include an unlock button 64, a lock button 66, a panic button 68 and/or a lights button 70. The particular buttons and the functions of the various buttons may change for particular vehicles. Therefore, the application should not be construed as being limited to a specific configuration. Transmitter 60 also includes a transmitting antenna 72. A transmitter circuit 74 is coupled to the antenna 72. Upon the depression of one of the buttons 64-70, transmitter circuit 74 generates signals to be transmitted through the antenna 72. In one embodiment of the invention, the transmitter circuit 74 uses a first protocol such as amplitude shift keying to generate the signals that are to be received by receiver 28 through antenna 30. The data from the transmitted signals may be used to control locks 80 or lights 82. For example, locks 80 may be coupled to each of the door locks and may be operated in various known manners. For example, upon the depression of the unlock key 64, the driver door may unlock and the remaining doors lock. Thereafter, if the unlock button 64 is depressed a second time within a predetermined time period, all the vehicle doors may become unlocked. If the light button 70 is depressed, various lights on exterior mirrors, running boards, headlights or interior lights may be illuminated for a predetermined period of time.

Figure 2:
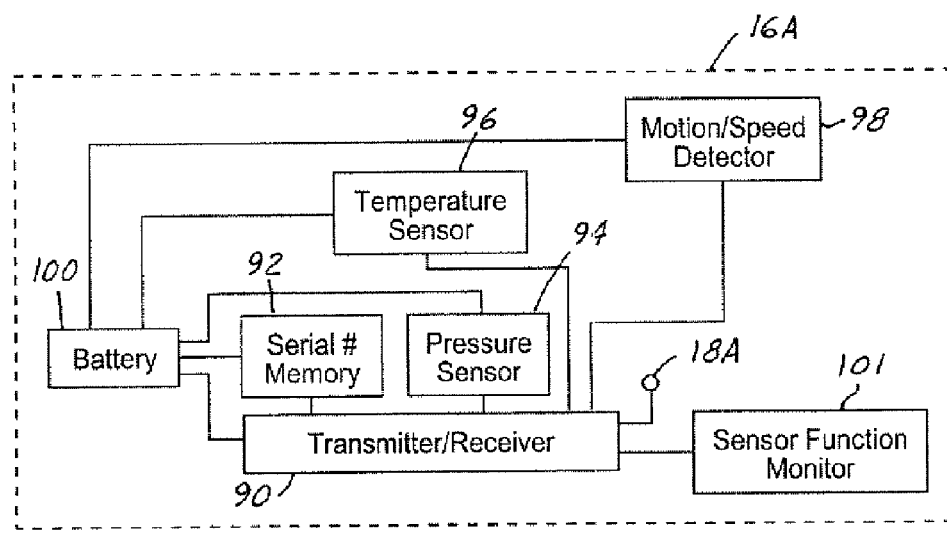
FIG. 2 is a block diagrammatic view of a pressure transmitter according to the present invention.

Referring now to FIG. 2, a typical tire pressure sensor circuit 16a is illustrated. Although only one tire pressure sensor circuit 16 is shown, each may be commonly configured. Pressure monitoring system 12 has a transmitter/receiver or transceiver 90. Transmitter/receiver 90 is coupled to antenna 18a for transmitting various information to receiver 28. The receiver portion may be used to receive an activation signal for an initiator located at each wheel. The pressure sensor may have various information such as a serial number memory 92, a pressure sensor 94 for determining the pressure within the tire, a temperature sensor 96 for determining the temperature within the tire, and a motion/vehicle speed detector 98 which may be used to activate the system pressure sensing system and generate a vehicle speed signal. The initial message is referred to as a "wake" message, meaning the pressure sensing circuit is now activated to send its pressure transmissions and the other data.

Each of the transceiver 90, serial number memory 92, pressure sensor 94, temperature sensor 96, and motion sensor 98 is coupled to battery 100. Battery 100 is preferably a long-life battery capable of lasting through the life of the tire.

A sensor function monitor 101 may also be incorporated into tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Referring now to FIG. 3, transmitter/receiver circuit 90 of FIG. 2 is illustrated in further detail. Transmitter/receiver circuit 90 may include an amplitude shift key modulator 110 that generates signals using a first protocol and a frequency shift key modulator 112 that generates signals using a second protocol. The two signals may be coupled to antenna 18 for transmission to receiver 28. The first and second protocols may be a variety of different protocols including, but not limited to, modulation protocols such as ASK (Amplitude Shift Keying), FSK (Frequency Shift Keying), PSK (Phase Shift Keying), OOK (On/Off Keying—this is actually 100% ASK modulation). The basic model of the signal is: s(t)=A cos(wt+theta).

ASK is heavily used due to its simplicity. ASK uses a change in the amplitude (A) of the signal to encode a bit.

FSK is the next most common type of protocol. FSK uses a change in the frequency (w) of the signal to encode a bit.

PSK is the least likely used. PSK uses a change in the phase (theta) of the signal to encode a bit.

There are sub branches of PSK such as Quadrature PSK (QPSK) that are simply special cases like OOK is a special case of ASK. Each of these parameters can be changed in an infinite number of ways by the choice of the parameter.

Encoding changes may also be used as a different protocol such as Manchester is simply the use of two signal states (w1 and w2 in the case of FSK) to indicate a single bit (zero or one). The most common form is 50% Manchester where the two states are both present for 50% of the time. Other common percentages are 25% and 33%. It is not required to use this type of encoding. Some applications simply use w1 as a zero and w2 as a one in an FSK system.

Center frequency changes may also vary the protocol. The frequency of a ASK or PSK signal or the center frequency of a FKS signal (w_center=(w1+w2)/2) may be changed.

Referring now to FIG. 4, an example of a data signal 114 that may be transmitted from the transmitter/receiver 90 is illustrated. In this example, an ASK preamble 116 and an ASK data signal 118 may be transmitted together with an FSK preamble 120 and an FSK data signal 122. As will be further described below, the signal 114 may include both protocols when the vehicle speed is below a predetermined vehicle speed threshold.

Referring now to FIG. 5, the data signal 114' may generate a signal using only the second protocol when the vehicle speed is above the predetermined vehicle speed threshold. In this embodiment, the FSK preamble 20' and FSK data 122' is illustrated as the only signals generated when the vehicle speed is above the threshold. In some embodiments it may be useful to maintain both protocols above and below the vehicle speed threshold.

Referring now to FIG. 6, antenna 30 is illustrated in further detail. Antenna 30 may be programmed with an ASK demodulator 126 to receiver signals from the transmitter 60 using a first protocol. The receiver may also include an FSK demodulator 128 to receive signals from the transmitter 60 through antenna 30.

Referring now to FIG. 7, a method of operating the system is illustrated. In step 150, the vehicle speed is determined. The vehicle speed may be determined using the speed sensor 38 described above. Also, the vehicle speed may be independently determined at each of the wheels by the motion/speed detector 98 described in FIG. 2. In step 152, it is determined whether the vehicle is below a speed threshold. In step 152, if the vehicle is below the speed threshold, step 154 is executed. One example of a speed threshold is 20 miles per hour. In step 154, data may be transmitted using two protocols from the tire pressure sensors 16A-16E. That is, both preambles and both data portions may use different protocols such as amplitude shift keying and frequency shift keying. In step 156, the receiver operates using a demodulator in a first mode. Carrying through with the example above, the first protocol may be amplitude shift keying. Thus, the amplitude shift key portion of the pressure transmitter will be used as well as any information transmitted from the remote keyless entry system 23. After step 156, the system ends in step 158.

Referring back to step 152, if the vehicle speed is not below a speed threshold, step 160 is executed. In step 160, data may be transmitted from the tire pressure sensors using the second protocol. As mentioned above, this may be performed exclusively and therefore the signal using the first protocol may not be generated. In some embodiments it may, however, be desirable to generate both signals. In step 162, the remote keyless entry system may be disabled.

In step 164, the receiver may operate in a second protocol mode when the vehicle speed is above the threshold. Switching from one protocol to another may be advantageous for a variety of reason. For example, advantageous in that amplitude shift keyed signals tend to be distorted at higher vehicle speeds. Therefore, the receiver may operate in a frequency shift mode when the vehicle speed is above a predetermined vehicle speed threshold. After step 164, operation of the system ends in step 158.

While particular embodiments of the invention have been shown and described, numerous variations and alternate embodiments will occur to those skilled in the art. Accordingly, it is intended that the invention be limited only in terms of the appended claims.

What is claimed is:

1. A method comprising the steps of:
   determining a vehicle speed;

when the vehicle speed is below a speed threshold, generating a preamble signal and a data signal using a first protocol from a tire pressure sensor and also generating another preamble signal and another data signal using a second protocol from the tire pressure sensor;

when the vehicle speed is above the speed threshold, generating a preamble signal and a data signal using the second protocol from the tire pressure sensor;

when the vehicle speed is below the speed threshold, operating a receiver using the first protocol; and also using the second protocol; and when the vehicle speed is above the speed threshold, operating the receiver using the second protocol.

2. A method as recited in claim 1, said method further comprising the step of:

when the vehicle speed is below the speed threshold, operating a vehicle system using the first protocol.

3. A method as recited in claim 2, said method further comprising the step of:

when the vehicle speed is above the speed threshold, disabling the vehicle system.

4. A method as recited in claim 3, wherein the vehicle system comprises a remote keyless entry system.

5. A method as recited in claim 1, wherein the first protocol comprises amplitude shift key.

6. A method as recited in claim 1, wherein the second protocol comprises frequency shift key.

7. A method as recited in claim 1, wherein the speed threshold is about 20 miles per hour.

8. A method as recited in claim 1, wherein the step of determining a vehicle speed is accomplished by using a speed detector circuit of a pressure transmitter circuit and also a vehicle speed sensor.

9. A system comprising:

a speed sensor for generating a vehicle speed signal;

a receiver for operation using a first protocol and a second protocol when the vehicle speed signal is below a speed threshold and using the second protocol when the vehicle speed signal is above the speed threshold;

a remote keyless entry system coupled to the receiver for operation when the vehicle speed signal is below the speed threshold, said remote keyless entry system operable to receive signals from a keyless entry transmitter using the first protocol; and a tire pressure monitoring system coupled to the receiver, said tire pressure monitoring system having a pressure transmitter for generating preamble and data signals using the first protocol and the second protocol when the vehicle speed signal is below the speed threshold and also generating preable and data signals using only the second protocol when the vehicle speed signal is above the speed threshold.

10. A system as recited in claim 9, wherein the first protocol comprises amplitude shift key.

11. A system as recited in claim 9, wherein the second protocol comprises frequency shift key.

12. A system as recited in claim 9, wherein the remote keyless entry system is operable to be disabled when the vehicle speed signal is above the speed threshold.

13. A system as recited in claim 9, wherein the speed sensor comprises a speed detector in a pressure transmitter.

14. A system as recited in claim 9, wherein the speed sensor comprises a vehicle speed sensor.

15. A system as recited in claim 9, wherein the speed sensor comprises a speed detector in a pressure transmitter and also a vehicle speed sensor.

16. A method comprising the steps of:

determining a vehicle speed;

when the vehicle speed is below a speed threshold, operating a remote keyless entry system using a first protocol;

when the vehicle speed is below the speed threshold, generating a preamble signal and a data signal using the first protocol from a tire pressure sensor, and generating another preamble signal and another data signal using a second protocol from the tire pressure sensor;

when the vehicle speed is above the speed threshold, generating a preamble signal and a data signal using the second protocol from the tire pressure sensor;

when the vehicle speed is below the speed threshold, operating a receiver using the first protocol and also using the second protocol;

when the vehicle speed is above the speed threshold, operating the receiver using the second protocol and without using the first protocol; and when the vehicle speed is above the speed threshold, disabling the remote keyless entry system.

17. A method as recited in claim 16, wherein the first protocol comprises amplitude shift key.

18. A method as recited in claim 16, wherein the second protocol comprises frequency shift key.

19. A method as recited in claim 16, wherein the step of determining a vehicle speed is accomplished by using a speed detector circuit of a pressure transmitter circuit and also a vehicle speed sensor.

* * * * *